(12) United States Patent
Krishnakumar et al.

(10) Patent No.: US 11,812,162 B2
(45) Date of Patent: Nov. 7, 2023

(54) DISTRIBUTION OF VIDEO PROCESSING TASKS

(71) Applicant: Dell Products L.P., Round Rock, TX (US)

(72) Inventors: Karthik Krishnakumar, Austin, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 332 days.

(21) Appl. No.: 17/354,323

(22) Filed: Jun. 22, 2021

(65) Prior Publication Data
US 2022/0408016 A1 Dec. 22, 2022

(51) Int. Cl.
*H04N 23/80* (2023.01)
*H04N 5/272* (2006.01)
*H04N 7/15* (2006.01)
*G06T 5/00* (2006.01)

(52) U.S. Cl.
CPC ............ *H04N 23/80* (2023.01); *G06T 5/002* (2013.01); *H04N 5/272* (2013.01); *H04N 7/15* (2013.01); *G06T 2207/10016* (2013.01)

(58) Field of Classification Search
CPC ................. G06T 5/002; H04N 23/80
See application file for complete search history.

(56) References Cited

U.S. PATENT DOCUMENTS

| | | | |
|---|---|---|---|
| 2002/0149672 A1* | 10/2002 | Clapp | H04N 7/15 348/E7.083 |
| 2011/0109725 A1* | 5/2011 | Yu | H04N 21/4788 348/47 |
| 2023/0179742 A1* | 6/2023 | Doken | G06F 11/3041 348/14.08 |

\* cited by examiner

*Primary Examiner* — Shivang I Patel
(74) *Attorney, Agent, or Firm* — McDermott Will & Emery LLP

(57) ABSTRACT

Distributing video processing tasks, including: detecting an event condition at the information handling system, and in response: identifying a video processing task associated with the event condition; identifying contextual information associated with contextual inputs to the information handling system; identifying a particular configuration rule based on i) the video processing task, ii) the contextual information, iii) the computing capabilities of the first video processing computing module, and iv) the computing capabilities of the second video processing computing module, wherein each of the plurality of configuration rules indicates a processing configuration of the first video processing computing module and the second video processing computing module; applying the particular configuration rule to the first video processing module and the second video processing module; offloading, based on the particular configuration rule, the video processing task by the second video processing computing module performing the video processing task at the external video computing device.

20 Claims, 5 Drawing Sheets

DISTRIBUTION OF VIDEO PROCESSING TASKS

BACKGROUND

Field of the Disclosure

The disclosure relates generally to an information handling system, and in particular, distribution of video processing tasks at an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of distributing video processing tasks, including registering, by a first video processing computing module executing on an information handling system, computing capabilities of the first video processing computing module with an external video computing device; registering, by a second video processing computing module executing on the external video computing device, computing capabilities of the second video processing computing module with the information handling system; detecting an event condition at the information handling system, and in response: identifying a video processing task associated with the event condition; identifying contextual information associated with contextual inputs to the information handling system; identifying a particular configuration rule from a plurality of configuration rules based on i) the video processing task, ii) the contextual information, iii) the computing capabilities of the first video processing computing module, and iv) the computing capabilities of the second video processing computing module, wherein each of the plurality of configuration rules indicates a processing configuration of the first video processing computing module and the second video processing computing module; applying the particular configuration rule to the first video processing module and the second video processing module; and offloading, based on the particular configuration rule, the video processing task by the second video processing computing module performing the video processing task at the external video computing device.

Other embodiments of these aspects include corresponding systems, apparatus, and computer programs, configured to perform the actions of the methods, encoded on computer storage devices.

These and other embodiments may each optionally include one or more of the following features. For instance, detecting an additional event condition at the information handling system, and in response: identifying an additional video processing task associated with the additional event condition; identifying contextual information associated with contextual inputs to the information handling system; identifying an additional configuration rule from the plurality of configuration rules based on i) the additional video processing task, ii) the contextual information, iii) the computing capabilities of the first video processing computing module, and iv) the computing capabilities of the second video processing computing module; applying the additional configuration rule to the first video processing module and the second video processing module; and performing, based on the additional configuration rule, the additional video processing task by the first video processing computing module at the information handling system. Performing the video processing task at the external video computing device includes performing the video processing task only at the external video computing device. Identifying the contextual information further comprises identifying one or more of calendaring information stored at the information handling system associated with a user of the information handling system; a user presence of the user with respect to the information handling system; a battery state of charge of a battery of the information handling system; and a computing processing load associated with the information handling system. Performing the video processing task at the external video computing device includes implementing a virtual background within a video feed captured by the external video computing device. Performing the video processing task at the external video computing device includes implementing a virtual image effect within a video feed captured by the external video computing device. Performing the video processing task at the external video computing device includes implementing a background blur within a video feed captured by the external video computing device. Detecting the event condition at the information handling system further includes detecting a docking event of the information handling system with respect to a docking station. Detecting the event condition at the information handling system further includes detecting a launch of a videoconferencing computer-executable program at the information handling system. The external video computing device is a video camera. The computing capabilities of the second video processing computing module includes video fidelity computing capabilities of the video camera.

Particular implementations of the subject matter described in this specification can be implemented so as to realize one or more of the following advantages. For example, power consumption at the information handling system can be reduced; the temperature (e.g., skin temperature) of the information handling can be reduced; and a fan speed (and loudness) can be reduced at the information handling system.

The details of one or more embodiments of the subject matter described in this specification are set forth in the accompanying drawings and the description below. Other

DESCRIPTION OF PARTICULAR EMBODIMENT(S)

Figure 1:
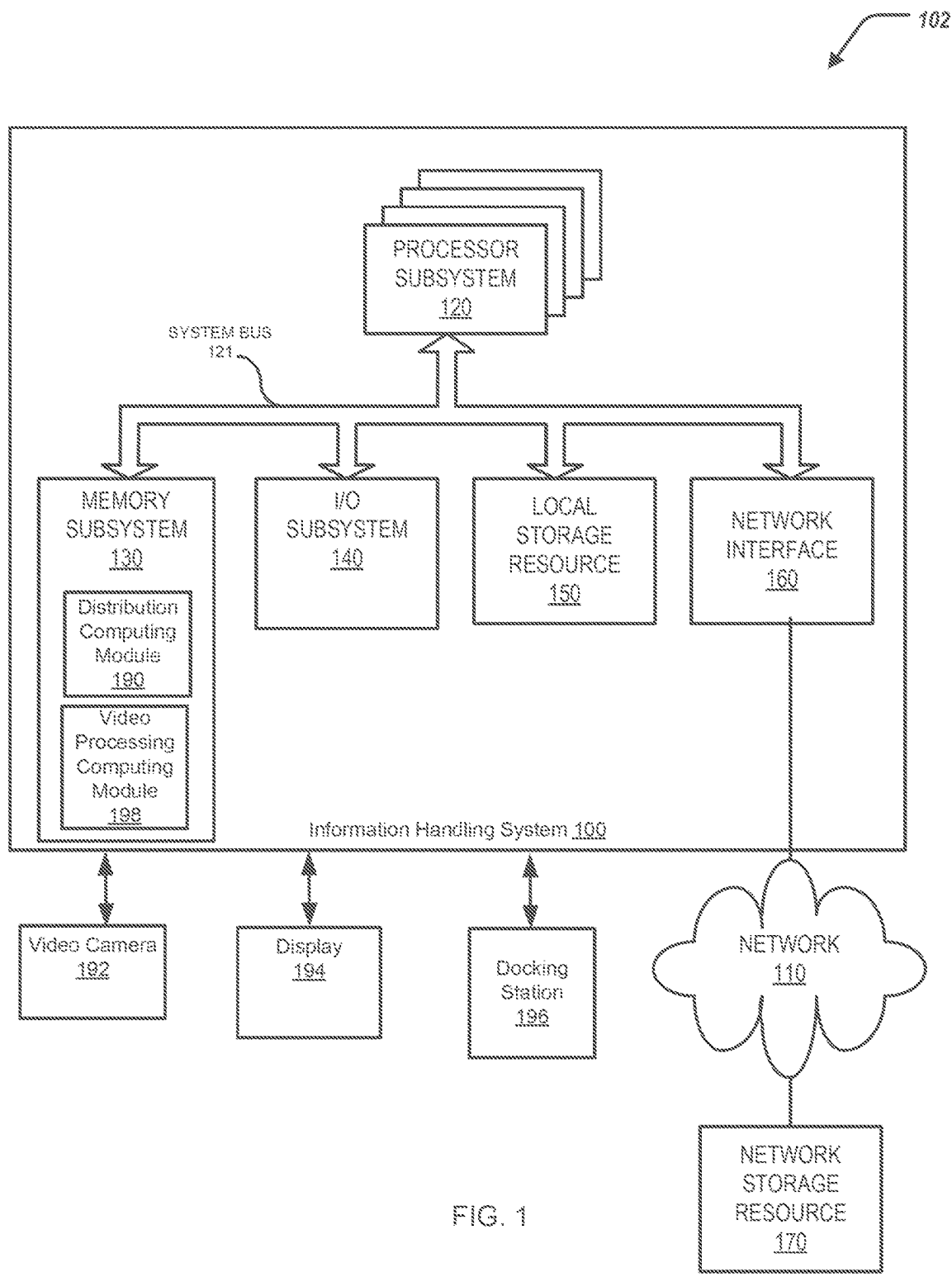
FIG. 1 is a block diagram of selected elements of an embodiment of an information handling system.

This disclosure discusses methods and systems for distribution of video processing tasks. In short, video processing tasks can be distributed between an information handling system and a camera based on a number of factors, such as contextual inputs, and the processing capabilities of each of the information handling system and the camera.

Specifically, this disclosure discusses a system and a method for distributing video processing tasks, including registering, by a first video processing computing module executing on an information handling system, computing capabilities of the first video processing computing module with an external video computing device; registering, by a second video processing computing module executing on the external video computing device, computing capabilities of the second video processing computing module with the information handling system; detecting an event condition at the information handling system, and in response: identifying a video processing task associated with the event condition; identifying contextual information associated with contextual inputs to the information handling system; identifying a particular configuration rule from a plurality of configuration rules based on i) the video processing task, ii) the contextual information, iii) the computing capabilities of the first video processing computing module, and iv) the computing capabilities of the second video processing computing module, wherein each of the plurality of configuration rules indicates a processing configuration of the first video processing computing module and the second video processing computing module; applying the particular configuration rule to the first video processing module and the second video processing module; and offloading, based on the particular configuration rule, the video processing task by the second video processing computing module performing the video processing task at the external video computing device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of a computing environment 102 including an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a distribution computing module 190. The distribution computing module 190 can be included by the memory subsystem 130. The distribution computing module 190 can include a computer-executable program (software). The distribution computing module 190 can be executed by the processor subsystem 120.

The information handling system 100 can also include a video processing computing module 198. The video processing computing module 198 can be included by the memory subsystem 130. The video processing computing module 198 can include a computer-executable program (software). The video processing computing module 198 can be executed by the processor subsystem 120.

The environment 102 can further include a video camera 192, a display 194, and a docking station 196; each in communication with the information handling system 100.

In short, the distribution computing module 190 can distribute video processing tasks between the information handling system 100 and the camera 192 based on a number of factors, such as contextual inputs, and the processing capabilities of each of the information handling system 100 and the camera 192.

Figure 2:
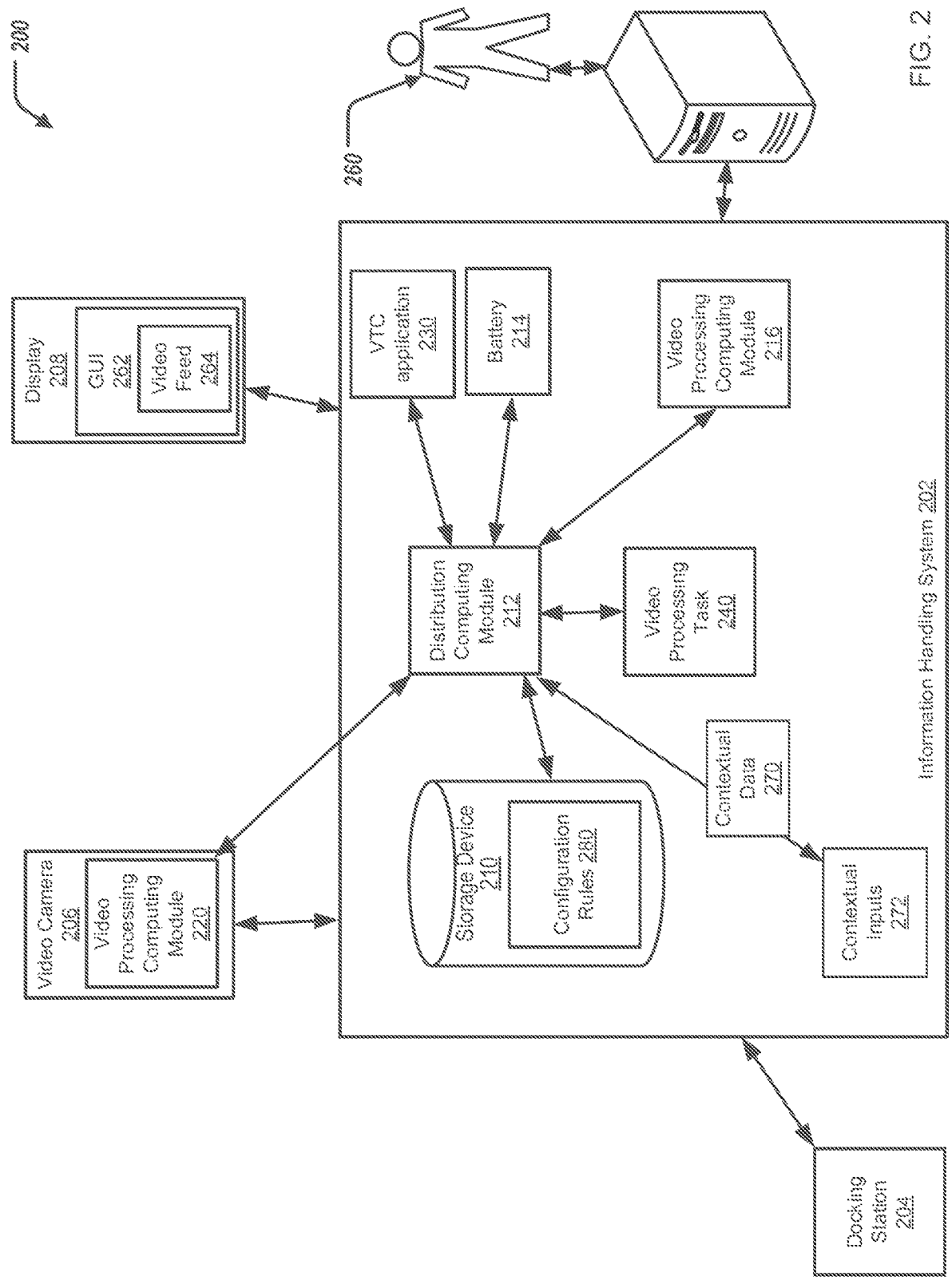
FIGS. 2-4 illustrate respective block diagrams of a computing environment for distribution of video processing tasks.

Turning to FIG. 2, FIG. 2 illustrates an environment 200 including an information handling system 202, a docking station 204, a video camera 206 (or video computing device 206, or external video computing device 206), and a display 208. The information handling system 202 can include a storage device 210, a distribution computing module 212, a battery (or battery source) 214, and a video processing computing module 216. In some examples, the information handling system 202 is similar to, or includes, the information handling system 100 of FIG. 1. In some examples, the distribution computing module 212 is the same, or substantially the same, as the distribution computing module 190 of FIG. 1. In some examples, the video processing computing module 216 is the same, or substantially the same, as the video processing computing module 198 of FIG. 1. In some examples, the docking station 204 is the same, or substantially the same, as the docking station 196 of FIG. 1. In some examples, the video camera 206 is the same, or substantially the same, as the video camera 192 of FIG. 1. In some examples, the display 208 is the same, or substantially the same, as the display 194 of FIG. 1.

The video camera 206 can further include a video processing computing module 220. The video processing computing module 220 is the same, or substantially the same, as the video processing computing module 198 of FIG. 1. Additionally, the video camera 206 can include or more additional computing components, such as the processor subsystem 120, the system bus 121, the memory subsystem 130, the I/O subsystem 140, the local storage resource, and/or the network interface 160, of FIG. 1.

To that end, information handling system 202, and specifically, the distribution computing module 212 can facilitate distribution of video processing tasks. Specifically, the video processing computing module 216 can register computing capabilities of the video processing computing module 216 with the distribution computing module 212. The computing capabilities can include a processing speed, bandwidth, or other similar computing capabilities related to video processing, video rendering, and/or general video editing capabilities. Furthermore, the distribution computing module 212 can register, with the video camera 206 (external video computing device 206) the computing capabilities of the video processing computing module 216. In some examples, the video processing computing module 216 can register the computing capabilities of the video processing computing module 216 directly with the video camera 206.

The video processing computing module 220 can register computing capabilities of the video processing computing module 220 with the distribution computing module 212. The computing capabilities can include a processing speed, bandwidth, or other similar computing capabilities related to video processing, video rendering, and/or general video editing capabilities. Furthermore, the distribution computing module 212 can register, with the information handling system 202 the computing capabilities of the video processing computing module 220. In some examples, the video processing computing module 220 can register the computing capabilities of the video processing computing module 220 directly with the information handling system 202.

In some examples, the computing capabilities of the video processing computing module 220 and/or the camera 206 include video fidelity computing capabilities of the video camera 206. In some examples, the video camera 206 and/or the video processing computing module 220 includes hardware accelerators.

The distribution computing module 212 can detect an event condition at the information handling system 202. In some examples, detecting the event condition can include the distribution computing module 212 detecting a docking event at the information handling system 202 with respect to the docking station 204. That is, the event condition can include the information handling system 202 becoming docked (coupled/engaged) with the docking station 204. The event condition can include the information handling system 202 becoming undocked (decoupled/disengaged) with the docking station 204. In some examples, detecting the event condition can include the distribution computing module 212 detecting a launch/execution of a videoconferencing (VTC) 230 computer-executable (computer-implemented) program at the information handling system 202.

The distribution computing module 212, in response to detecting the event condition at the information handling system 202, identifies a video processing task 240 associated with the event condition. The video processing task 240 can include any computer-implemented action/task/process associated with a video/image that is obtained by the camera 206. For example, the video camera 206 can obtain, in real-time, a video feed/video recording of a user 260 associated with the information handling system 202. The video camera 206 can provide such a video feed/video recording to the information handling system 202 for display on a graphical user interface 262 of the display 208, shown as video feed 264. The video processing task 240 can be associated with the video feed 264, including processing of the video feed 264, manipulation/editing of the video feed 264, and any other type of video processing computing task associated with generation and editing of the video feed 264 (including augmented/virtual reality video editing/effects).

The distribution computing module 212, further in response to detecting the event condition at the information handling system 202, can identify contextual information 270 associated with contextual inputs 272 to the information handling system 202. In some examples, the contextual input 272 can be calendar computing executable program accessible or executable by the information handling system 202, and the contextual data 270 can include calendaring information/data stored at or accessible by the information handling system 202, with the calendaring information associated with the user 260. The calendaring information can include such details as a schedule of the user 260 as it relates the VTC application 230—e.g., when the user 260 will implement the VTC application 230. In some examples, the contextual data 270 can include a presence of the user 260 with respect to the display 208, the video camera 206, and/or the information handling system 202. For example, the contextual data 270 can represent a binary presence detection of the user 260 (present/not present). For example, the contextual data 272 can include a heat map (thermal) representing a user direction/state of the user 260 with respect to the video camera 206, the display 208, and/or the information handling system 202. In some examples, the contextual data 270 can include a battery state of charge (SOC) of the battery 214. For example, the SOC can indicate a percentage of charge remaining of the battery 214, a percentage of maximum charge of the battery 214 (prior to degradation), or a combination thereof. In some examples, the contextual data 270 includes a computing processing load associated with the information handling system 202. For example, the processing load of the information handling system 202 can include a processing load of the processor subsystem 120 (of FIG. 1), and can include an available processor bandwidth.

The distribution computing module 212, further in response to detecting the event condition at the information handling system 202, can identify a particular configuration rule 280 from a plurality of configuration rules for application. Specifically, each of the configuration rules 280, stored by the storage device 210, indicates a processing configuration of the video processing computing modules 216, 220. That is, each configuration rule 280 indicates which video processing computing module 216, 220 will implement/process/execute the video processing task 240; and/or indicates which video processing computing module 216, 220 will implement/process/execute which portions of the video processing task 240. Each of the configuration rules 280 is associated with i) a type/category or a specific video process task (e.g., the video processing task 240), ii) contextual information (e.g., the contextual data 270), iii) the computing capabilities of the video processing computing module 216, and/or iv) the computing capabilities of the video processing computing module 220. Thus, the distribution computing module 212, in response to detecting the event condition, can identify a particular configuration rule 280 stored by the storage device 210 that is based on i) the video processing task 240, ii) the contextual data 270, iii) the computing capabilities of the video processing computing module 216, and/or iv) the computing capabilities of the video processing computing module 220.

The distribution computing module 212, further in response to detecting the event condition at the information handling system 202, can apply the particular configuration rule 280 to the video processing computing module 216 and/or the video processing computing module 220. That is, the distribution computing module 212 can apply the particular configuration rule 280 to the video processing computing module 216 and/or the video processing computing module 220 such that one or more of the video processing computing modules 216, 220 will implement/process/execute the video processing task 240; and or one or more of the video processing computing modules 216, 220 will implement/process/execute one or more portions of the video processing task 240.

Figure 3:
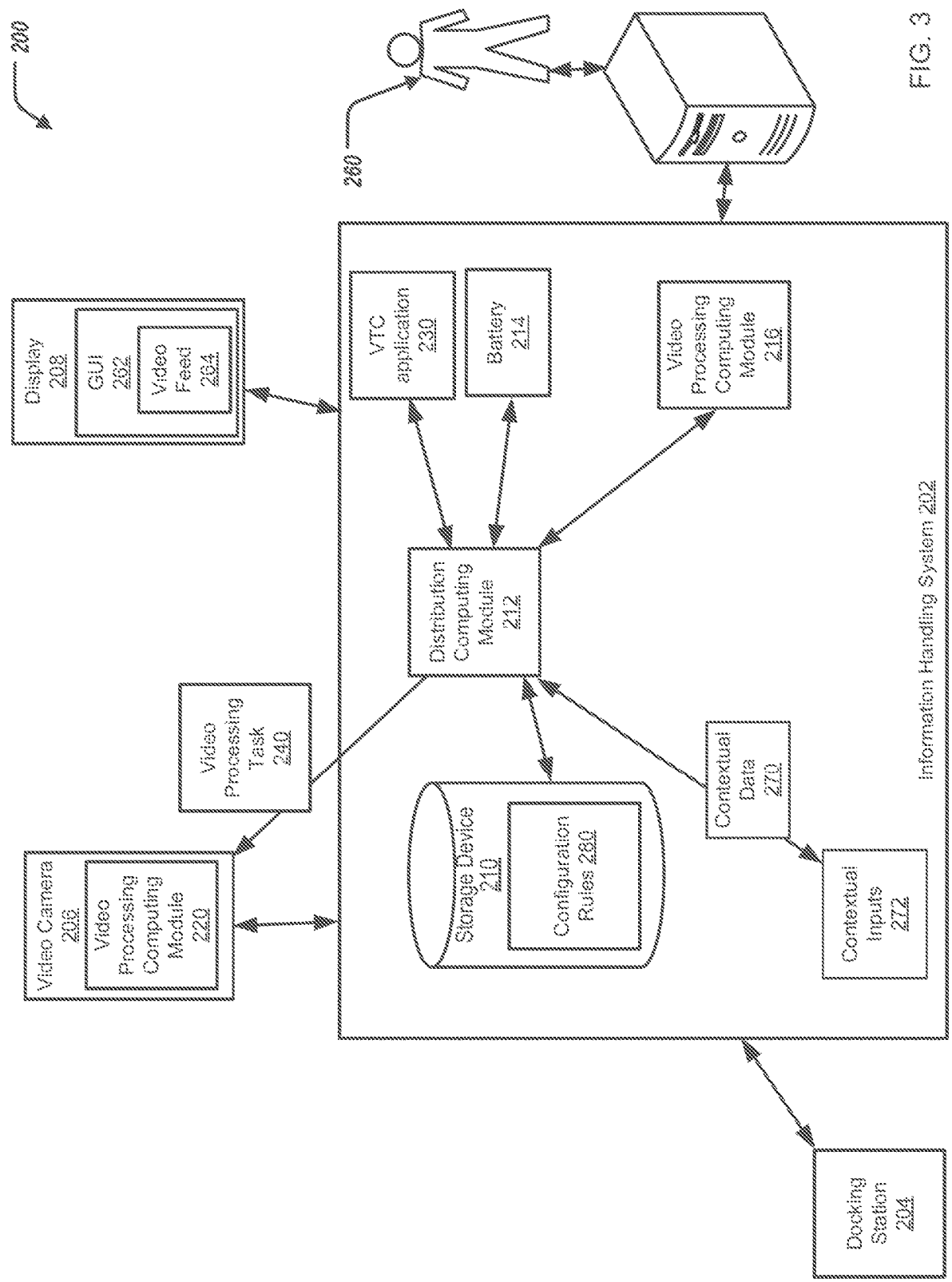

Referring to FIG. 3, the distribution computing module 212, further in response to detecting the event condition at the information handling system 202, can offload, based on the particular configuration rule 280, the video processing task to the video camera 206, and specifically, the video processing computing module 220, for performance/execution of the video processing task 240 by the video camera 206 and/or the video processing computing module 220. That is, the distribution computing module 212, based on the particular configuration rule 280, provides/transmits the video processing task 240 (or data related to the video processing task 240) to the video camera 206 and/or the video processing computing module 220. The video processing computing module 220 can execute the video processing task 240 such that video processing task 240 is offloaded from processing by the information handling system 202 and/or the video processing computing module 216.

Executing the video processing task 240 by the video processing computing module 220 and/or the camera 206 can include performing/executing any computer-implemented action/task/process associated with the video feed 264 displayed by the graphical user interface 262 of the display 208. The video processing task 240 can be associated with the video feed 264, including processing of the video feed 264, manipulation/editing of the video feed 264, and any other type of video processing computing task associated with generation and editing of the video feed 264 (including augmented/virtual reality video editing/effects).

In some examples, the distribution computing module 212, further in response to detecting the event condition at the information handling system 202, can offload, based on the particular configuration rule 280, the video processing task to the video camera 206, and specifically, the video processing computing module 220 for performance/execution of the video processing task 240 only by the video camera 206 and/or the video processing computing module 220.

In some examples, the distribution computing module 212, further in response to detecting the event condition at the information handling system 202, can offload, based on the particular configuration rule 280, the video processing task to the video camera 206, and specifically, the video processing computing module 220 for performance/execution of the video processing task 240 by the video camera 206 and/or the video processing computing module 220, including implementing a virtual background within the video feed 264. For example, the virtual background can include a solid color, or any virtual environment.

In some examples, the distribution computing module 212, further in response to detecting the event condition at the information handling system 202, can offload, based on the particular configuration rule 280, the video processing task to the video camera 206, and specifically, the video processing computing module 220 for performance/execution of the video processing task 240 by the video camera 206 and/or the video processing computing module 220, including implementing a virtual image effect within the video feed 264. For example, the virtual image effect can include any virtual image effect associated with any object of the video feed 264 (including a representation of the user 260), including any augmented reality/virtual reality effect associated with any object of the video feed 264 (including a representation of the user 260).

In some examples, the distribution computing module 212, further in response to detecting the event condition at the information handling system 202, can offload, based on the particular configuration rule 280, the video processing task to the video camera 206, and specifically, the video processing computing module 220 for performance/execution of the video processing task 240 by the video camera 206 and/or the video processing computing module 220, including implementing a background blur within the video feed 264. For example, the background blur can include blurring the background of the video feed 264, including an area surrounding a representation of the user 260.

In some examples, the distribution computing module 212, further in response to detecting the event condition at the information handling system 202, can offload, based on the particular configuration rule 280, the video processing task to the video camera 206, and specifically, the video processing computing module 220 for performance/execution of the video processing task 240 by the video camera 206 and/or the video processing computing module 220, including implementing background subtraction within the video feed 264. For example, one or more representation of other objects in the video 264 other than the representation of the user 260 can be removed, or altered, from the video feed 264.

In some examples, the distribution computing module 212, further in response to detecting the event condition at the information handling system 202, can offload, based on the particular configuration rule 280, the video processing task to the video camera 206, and specifically, the video processing computing module 220 for performance/execution of the video processing task 240 by the video camera 206 and/or the video processing computing module 220, including implementing image framing within the video feed 264. For example, the representation of the user 260 within the video feed 264 can be framed to be at a center (horizontally and/or vertically) of the video feed 264 (or any desired positioning within the video feed 264).

Figure 4:
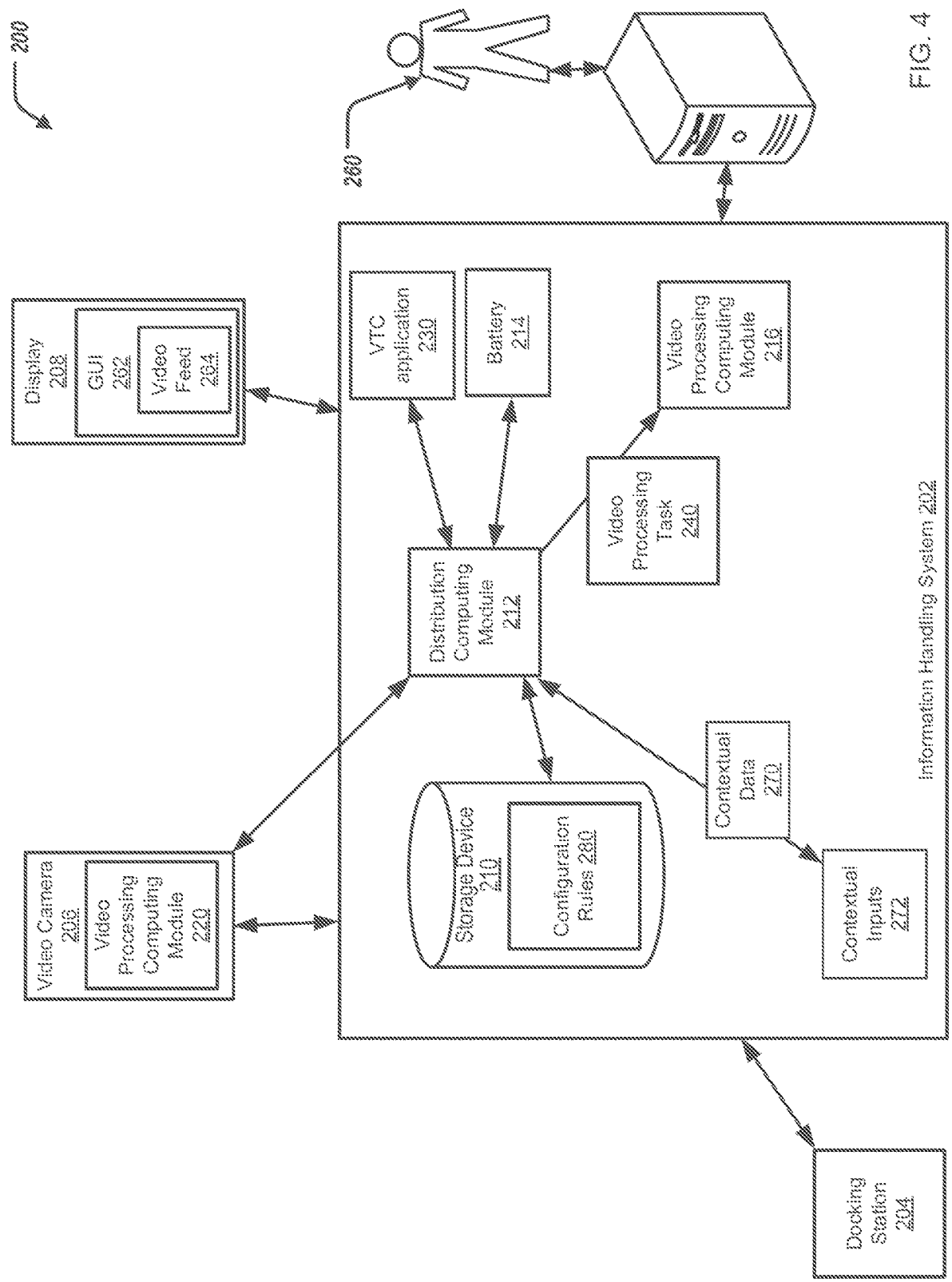

Referring to FIG. 4, the distribution computing module 212, further in response to detecting the event condition at the information handling system 202, can provide the video processing task 240 to the video processing computing module 216 such that the video processing computing module 216 and/or the information handling system 202 can perform, based on the particular configuration rule 280, the video processing task 240. That is, the distribution computing module 212, based on the particular configuration rule 280, provides/transmits the video processing task 240 (or data related to the video processing task 240) to the video processing computing module 216. The video processing computing module 216 can execute the video processing task 240.

Executing the video processing task 240 by the video processing computing module 216 can include performing/ executing any computer-implemented action/task/process associated with the video feed 264 displayed by the graphical user interface 262 of the display 208. The video processing task 240 can be associated with the video feed 264, including processing of the video feed 264, manipulation/ editing of the video feed 264, and any other type of video processing computing task associated with generation and editing of the video feed 264 (including augmented/virtual reality video editing/effects).

In some examples, the distribution computing module 212, further in response to detecting the event condition at the information handling system 202, provides the video processing task 240 to the video processing computing module 216 such that only the video processing computing module 216 and/or the information handling system 202 can perform, based on the particular configuration rule 280, the video processing task 240.

In some examples, the distribution computing module 212, further in response to detecting the event condition at the information handling system 202, can provide the video processing task 240 to the video processing computing module 216 such that the video processing computing module 216 and/or the information handling system 202 can perform, based on the particular configuration rule 280, the video processing task 240, including implementing a virtual background within the video feed 264. For example, the virtual background can include a solid color, or any virtual environment.

In some examples, the distribution computing module 212, further in response to detecting the event condition at the information handling system 202, can provide the video processing task 240 to the video processing computing module 216 such that the video processing computing module 216 and/or the information handling system 202 can perform, based on the particular configuration rule 280, the video processing task 240, including implementing a virtual image effect within the video feed 264. For example, the virtual image effect can include any virtual image effect associated with any object of the video feed 264 (including a representation of the user 260), including any augmented reality/virtual reality effect associated with any object of the video feed 264 (including a representation of the user 260).

In some examples, the distribution computing module 212, further in response to detecting the event condition at the information handling system 202, can provide the video processing task 240 to the video processing computing module 216 such that the video processing computing module 216 and/or the information handling system 202 can perform, based on the particular configuration rule 280, the video processing task 240, including implementing a background blur within the video feed 264. For example, the background blur can include blurring the background of the video feed 264, including an area surrounding a representation of the user 260.

In some examples, the distribution computing module 212, further in response to detecting the event condition at the information handling system 202, can provide the video processing task 240 to the video processing computing module 216 such that the video processing computing module 216 and/or the information handling system 202 can perform, based on the particular configuration rule 280, the video processing task 240, including implementing background subtraction within the video feed 264. For example, one or more representation of other objects in the video 264 other than the representation of the user 260 can be removed, or altered, from the video feed 264.

In some examples, the distribution computing module 212, further in response to detecting the event condition at the information handling system 202, can provide the video processing task 240 to the video processing computing module 216 such that the video processing computing module 216 and/or the information handling system 202 can perform, based on the particular configuration rule 280, the video processing task 240, including implementing image framing within the video feed 264. For example, the representation of the user 260 within the video feed 264 can be framed to be at a center (horizontally and/or vertically) of the video feed 264 (or any desired positioning within the video feed 264).

In a use case example, the distribution computing module 212 can detect an event condition of the information handling system 202 docking with (becoming coupled with) the docking station 204. The information handling system 202 can be further coupled with the display 208 (e.g., dual 4K resolution monitors), and coupled with a video camera 206 including vision processing (e.g., the video processing computing module 220). In some examples, the display 208 can include the video camera 206. The information handling system 202 can be experiencing 20% processing load (bandwidth). The contextual data 270 can include a calendaring invite regarding execution of the VTC application 230. Furthermore, the video processing task 240 can include implementing a virtual background of the video feed 264. The distribution computing module 212 can identify, based on i) the video processing task 240 (virtual background of the video feed 264), ii) the contextual data 270 (the calendaring information), iii) the computing capabilities of the video processing computing module 216, and/or iv) the computing capabilities of the video processing computing module 220, a particular configuration rule 280. Specifically, the distribution computing module 212, further in response to detecting the event condition at the information handling system 202, can offload, based on the particular configuration rule 280, the video processing task 240 (virtual background) to the video camera 206, and specifically, the video processing computing module 220 for performance/execution of the video processing task 240 only by the video camera 206 and/or the video processing computing module 220. That is, the video camera 206 and/or the video processing computing module 220 implements the virtual background with respect to the video feed 264.

In a use case example, the distribution computing module 212 can detect an event condition of the information handling system 202 un-docking with (becoming de-coupled from) the docking station 204. The information handling system 202 can be further coupled with the display 208 (e.g., conference room exterior monitor), and coupled with a video camera 206 that does not include vision processing (e.g., the video processing computing module 220). In some examples, the display 208 can include the video camera 206. The information handling system 202 can be experiencing 20% processing load (bandwidth). The contextual data 270 can include a calendaring invite regarding execution of the VTC application 230. Furthermore, the video processing task 240 can include implementing a virtual background of the video feed 264. The distribution computing module 212 can identify, based on i) the video processing task 240 (virtual background of the video feed 264), ii) the contextual data 270 (the calendaring information), iii) the computing capabilities of the video processing computing module 216, and/or iv) the computing capabilities of the video processing computing module 220, a particular configuration rule 280. Specifically, the distribution computing module 212, further in response to detecting the event condition at the information handling system 202, can have the video processing computing modules 216 for performance/execution of the video processing task 240 only by the video processing computing module 216. That is, the video processing computing module 216 implements the virtual background with respect to the video feed 264.

In a use case example, the distribution computing module 212 can detect an event condition of the information handling system 202 un-docking with (becoming de-coupled from) the docking station 204. The information handling system 202 can be further coupled with the display 208 (e.g., conference room exterior monitor), and coupled with a video camera 206 that includes vision processing (e.g., the video processing computing module 220). In some examples, the display 208 can include the video camera 206. The information handling system 202 can be experiencing 20% processing load (bandwidth). The contextual data 270 can include a calendaring invite regarding execution of the VTC application 230, and a battery health of the battery 214. Furthermore, the video processing task 240 can include implementing a virtual background of the video feed 264. The distribution computing module 212 can identify, based on i) the video processing task 240 (virtual background of the video feed 264), ii) the contextual data 270 (the calendaring information and the battery health of the battery 214), iii) the computing capabilities of the video processing computing module 216, and/or iv) the computing capabilities of the video processing computing module 220, a particular configuration rule 280. Specifically, the distribution computing module 212, further in response to detecting the event condition at the information handling system 202, can have the video processing computing module 220 and/or the camera 206 for performance/execution of the video processing task 240 only by the video processing computing module 220 and/or the camera 206. That is, the video processing computing module 220 and/or the camera 206 implements the virtual background with respect to the video feed 264.

Figure 5:
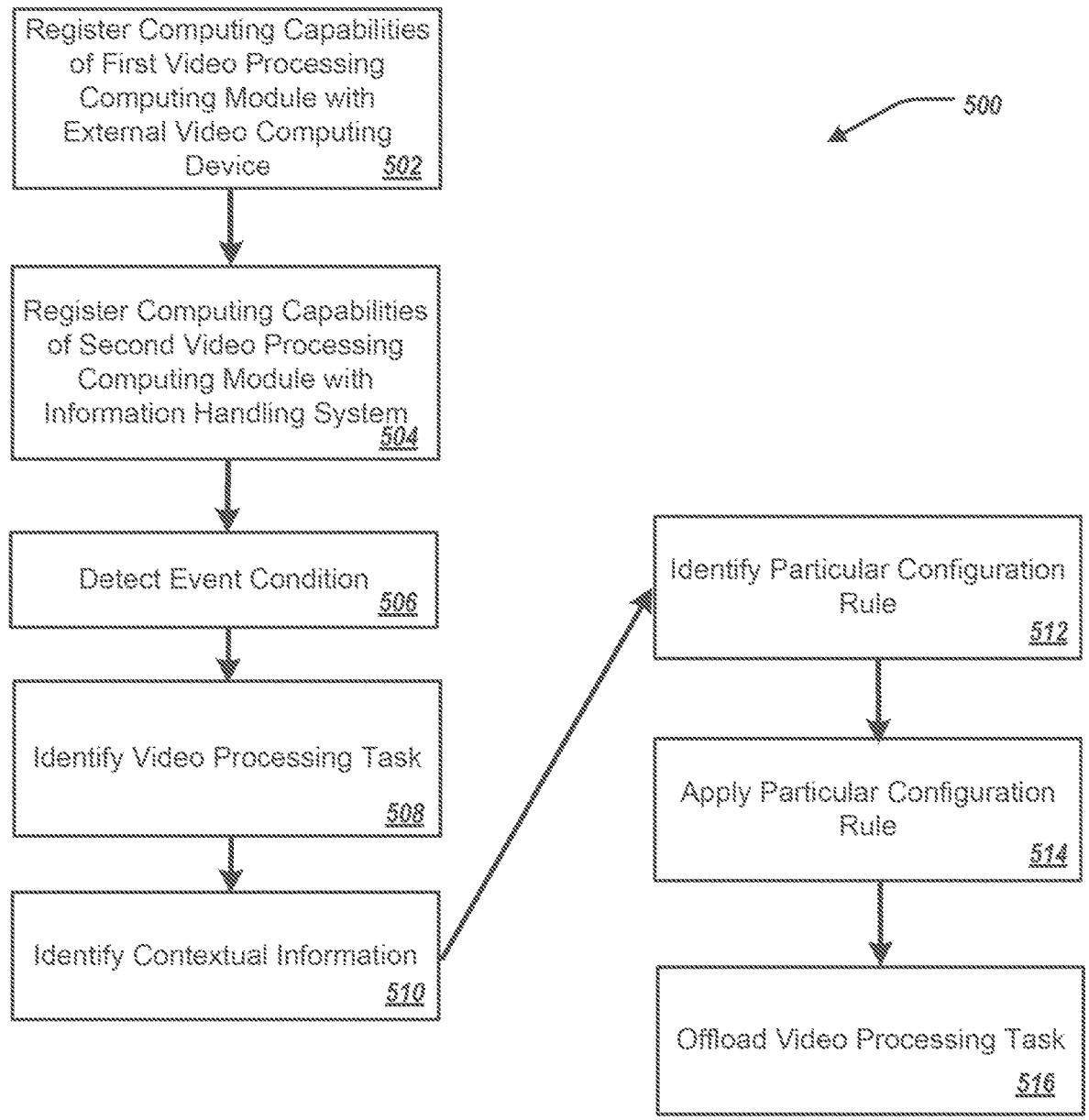
FIG. 5 illustrates a method for distribution of video processing tasks.

FIG. 5 illustrates a flowchart depicting selected elements of an embodiment of a method 500 for distribution of video processing tasks. The method 500 may be performed by the information handling system 100, the information handling system 202, the distribution computing module 212, the video processing computing module 216, and/or the video processing computing module 220, and with reference to FIGS. 1-4. It is noted that certain operations described in method 500 may be optional or may be rearranged in different embodiments.

The video processing computing module 216 registers computing capabilities of the video processing computing module 216 with external video computing device (the video camera 206) (502). The computing capabilities can include a processing speed, bandwidth, or other similar computing capabilities related to video processing, video rendering, and/or general video editing capabilities. Furthermore, the distribution computing module 212 can register, with the video camera 206 (external video computing device 206) the computing capabilities of the video processing computing module 216. The video processing computing module 220 registers computing capabilities of the video processing module 220 with the information handling system 202 (504). The computing capabilities can include a processing speed, bandwidth, or other similar computing capabilities related to video processing, video rendering, and/or general video editing capabilities. Furthermore, the distribution computing module 212 can register, with the information handling system 202 the computing capabilities of the video processing computing module 220. The distribution computing module 212 detects an event condition at the information handling system 202 (506). The distribution computing module 212 identifies the video processing task 240 associated with the event condition (508). The distribution computing module 212 identifies the contextual information 270 associated with contextual inputs 272 to the information handling system 202 (510). The distribution computing module 212 identifies a particular configuration rule 280 based on i) the video processing task 240, ii) the contextual information 270, iii) the computing capabilities of the video processing computing module 216, and iv) the computing capabilities of the video processing computing module 220 (512). The distribution computing module 212 applies the particular configuration rule 280 to the video processing computing module 216 and the video processing module 220 (514). The distribution computing module 212 offloads, based on the particular configuration rule 280, the video processing task 240 by the video processing computing module 220 performing the video processing task 240 at the video camera 206 (516).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for distributing video processing tasks, comprising:
   registering, by a first video processing computing module executing on an information handling system, computing capabilities of the first video processing computing module with an external video computing device;
   registering, by a second video processing computing module executing on the external video computing device, computing capabilities of the second video processing computing module with the information handling system;
   detecting an event condition at the information handling system, and in response:
      identifying a video processing task associated with the event condition;
      identifying contextual information associated with contextual inputs to the information handling system;
      identifying a particular configuration rule from a plurality of configuration rules based on i) the video processing task, ii) the contextual information, iii) the computing capabilities of the first video processing computing module, and iv) the computing capabilities of the second video processing computing module, wherein each of the plurality of configuration rules indicates a processing configuration of the first video processing computing module and the second video processing computing module;
      applying the particular configuration rule to the first video processing module and the second video processing module; and
      offloading, based on the particular configuration rule, the video processing task by the second video processing computing module performing the video processing task at the external video computing device.

2. The computer-implemented method of claim 1, further comprising:
   detecting an additional event condition at the information handling system, and in response:
      identifying an additional video processing task associated with the additional event condition;
      identifying contextual information associated with contextual inputs to the information handling system;
      identifying an additional configuration rule from the plurality of configuration rules based on i) the additional video processing task, ii) the contextual information, iii) the computing capabilities of the first video processing computing module, and iv) the computing capabilities of the second video processing computing module;
      applying the additional configuration rule to the first video processing module and the second video processing module; and
      performing, based on the additional configuration rule, the additional video processing task by the first video processing computing module at the information handling system.

3. The computer-implemented method of claim 1, wherein performing the video processing task at the external video computing device includes performing the video processing task only at the external video computing device.

4. The computer-implemented method of claim 1, wherein identifying the contextual information further comprises identifying one or more of calendaring information stored at the information handling system associated with a user of the information handling system; a user presence of the user with respect to the information handling system; a battery state of charge of a battery of the information handling system; and a computing processing load associated with the information handling system.

5. The computer-implemented method of claim 1, wherein performing the video processing task at the external video computing device includes implementing a virtual background within a video feed captured by the external video computing device.

6. The computer-implemented method of claim 1, wherein performing the video processing task at the external video computing device includes implementing a virtual image effect within a video feed captured by the external video computing device.

7. The computer-implemented method of claim 1, wherein performing the video processing task at the external video computing device includes implementing a background blur within a video feed captured by the external video computing device.

8. The computer-implemented method of claim 1, wherein detecting the event condition at the information handling system further includes detecting a docking event of the information handling system with respect to a docking station.

9. The computer-implemented method of claim 1, wherein detecting the event condition at the information handling system further includes detecting a launch of a videoconferencing computer-executable program at the information handling system.

10. The computer-implemented method of claim 1, wherein the external video computing device is a video camera.

11. The computer-implemented method of claim 10, wherein the computing capabilities of the second video processing computing module includes video fidelity computing capabilities of the video camera.

12. An information handling system comprising a processor having access to memory media storing instructions executable by the processor to perform operations, comprising:
   registering, by a first video processing computing module executing on an information handling system, computing capabilities of the first video processing computing module with an external video computing device;
   registering, by a second video processing computing module executing on the external video computing device, computing capabilities of the second video processing computing module with the information handling system;
   detecting an event condition at the information handling system, and in response:
      identifying a video processing task associated with the event condition;
      identifying contextual information associated with contextual inputs to the information handling system;
      identifying a particular configuration rule from a plurality of configuration rules based on i) the video processing task, ii) the contextual information, iii) the computing capabilities of the first video processing computing module, and iv) the computing capabilities of the second video processing computing module, wherein each of the plurality of configuration rules indicates a processing configuration of the first video processing computing module and the second video processing computing module;
applying the particular configuration rule to the first video processing module and the second video processing module; and
offloading, based on the particular configuration rule, the video processing task by the second video processing computing module performing the video processing task at the external video computing device.

13. The information handling system of claim 12, further comprising:
detecting an additional event condition at the information handling system, and in response:
identifying an additional video processing task associated with the additional event condition;
identifying contextual information associated with contextual inputs to the information handling system;
identifying an additional configuration rule from the plurality of configuration rules based on i) the additional video processing task, ii) the contextual information, iii) the computing capabilities of the first video processing computing module, and iv) the computing capabilities of the second video processing computing module;
applying the additional configuration rule to the first video processing module and the second video processing module; and
performing, based on the additional configuration rule, the additional video processing task by the first video processing computing module at the information handling system.

14. The information handling system of claim 12, wherein performing the video processing task at the external video computing device includes performing the video processing task only at the external video computing device.

15. The information handling system of claim 12, wherein identifying the contextual information further comprises identifying one or more of calendaring information stored at the information handling system associated with a user of the information handling system; a user presence of the user with respect to the information handling system; a battery state of charge of a battery of the information handling system; and a computing processing load associated with the information handling system.

16. The information handling system of claim 12, wherein performing the video processing task at the external video computing device includes implementing a virtual background within a video feed captured by the external video computing device.

17. The information handling system of claim 12, wherein performing the video processing task at the external video computing device includes implementing a virtual image effect within a video feed captured by the external video computing device.

18. The information handling system of claim 12, wherein performing the video processing task at the external video computing device includes implementing a background blur within a video feed captured by the external video computing device.

19. The information handling system of claim 12, wherein detecting the event condition at the information handling system further includes detecting a docking event of the information handling system with respect to a docking station.

20. A non-transitory computer-readable medium storing software comprising instructions executable by one or more computers which, upon such execution, cause the one or more computers to perform operations comprising:
registering, by a first video processing computing module executing on an information handling system, computing capabilities of the first video processing computing module with an external video computing device;
registering, by a second video processing computing module executing on the external video computing device, computing capabilities of the second video processing computing module with the information handling system;
detecting an event condition at the information handling system, and in response:
identifying a video processing task associated with the event condition;
identifying contextual information associated with contextual inputs to the information handling system;
identifying a particular configuration rule from a plurality of configuration rules based on i) the video processing task, ii) the contextual information, iii) the computing capabilities of the first video processing computing module, and iv) the computing capabilities of the second video processing computing module, wherein each of the plurality of configuration rules indicates a processing configuration of the first video processing computing module and the second video processing computing module;
applying the particular configuration rule to the first video processing module and the second video processing module; and
offloading, based on the particular configuration rule, the video processing task by the second video processing computing module performing the video processing task at the external video computing device.

* * * * *